(12) United States Patent
Connolly et al.

(10) Patent No.: US 8,823,364 B2
(45) Date of Patent: Sep. 2, 2014

(54) DC RESPONSIVE TRANSDUCER WITH ON-BOARD USER ACTUATED AUTO-ZERO

(75) Inventors: Thomas F. Connolly, Lake Forest, CA (US); Ming Zhong, Guangdong (CN)

(73) Assignee: Measurement Specialties, Inc., Hampton, VA (US)

( * ) Notice: Subject to any disclaimer, the term of this patent is extended or adjusted under 35 U.S.C. 154(b) by 251 days.

(21) Appl. No.: 12/914,550

(22) Filed: Oct. 28, 2010

(65) Prior Publication Data
US 2012/0105054 A1 May 3, 2012

(51) Int. Cl.
*G01P 3/42* (2006.01)
*G01P 15/00* (2006.01)

(52) U.S. Cl.
USPC .......................................... 324/162; 702/141

(58) Field of Classification Search
CPC .... G01P 15/123; G01P 15/00; G01P 2015/00
USPC .............. 324/160, 162, 207.12, 225; 73/1.37, 73/1.38, 1.85, 1.88, 514.33, 98, 649, 754, 73/765, 766; 340/514, 540; 374/1, 374/170–172, 183; 702/98
See application file for complete search history.

(56) References Cited

U.S. PATENT DOCUMENTS

| | | | | |
|---|---|---|---|---|
| 4,192,005 A | * | 3/1980 | Kurtz | 702/98 |
| 5,045,685 A | * | 9/1991 | Wall | 250/208.1 |
| 6,422,088 B1 | * | 7/2002 | Oba et al. | 73/754 |
| 6,424,143 B1 | * | 7/2002 | Blossfeld et al. | 324/160 |
| 6,722,203 B1 | * | 4/2004 | Evans et al. | 73/649 |
| 7,117,714 B2 | | 10/2006 | Nakayama | |
| 8,197,133 B2 | * | 6/2012 | Schultz et al. | 374/170 |
| 2002/0067255 A1 | * | 6/2002 | Tanizawa | 340/514 |
| 2010/0071466 A1 | | 3/2010 | Kanai et al. | |

OTHER PUBLICATIONS

Title: "Low Power, Single-Supply Difference Amplifier"; 1996 Burr-Brown Corporation for Texas Instrument; pp. 1-9 including addedum pp. 1-3.*
International Search Report dated Feb. 16, 2012 for related application PCT/US2011/058347.
"Operating Manual Model 101 3-Channel DC Signal Conditioner Amplifier", Measurement Specialties, Inc., Vibation Sensors Design Center, Operating Manual Model 101, Revision 1, 14 pages, www.meas-spec.comvibration@meas-spec.com. As accessed Feb. 15, 2011.
"Model 101 DC Signal Condtioner", Measurement Specialties, Inc., Model 101, Revision B, 2 pages, Jun. 5, 2009, enduser@meas-spec.com.

* cited by examiner

*Primary Examiner* — Arleen M Vazquez
*Assistant Examiner* — Hoang X Nguyen
(74) *Attorney, Agent, or Firm* — Howard IP Law Group, PC

(57) ABSTRACT

An accelerometer is provided having a power circuit, a detection circuit, and a compensation circuit. The compensation circuit is operative to measure an offset voltage occurring between an output reference voltage from the power circuit and an output voltage from the detection circuit state, store the offset voltage during a zero acceleration, and output the stored offset voltage to alter the output voltage of the detection circuit.

16 Claims, 3 Drawing Sheets

DC RESPONSIVE TRANSDUCER WITH ON-BOARD USER ACTUATED AUTO-ZERO

FIELD OF THE INVENTION

The present invention relates generally to transducers, and more particularly to accelerometers having circuitry compensating for drift.

BACKGROUND

Electronic devices commonly utilize piezoelectric, piezo-resistive and capacitive components to measure dynamic changes in mechanical variables such as acceleration, vibration, and mechanical shock. Such measurements are obtained by converting mechanical motion into an electrical signal. These devices are useful for a wide variety of applications including, but not limited to engineering, machine monitoring, biological study, navigation, medical applications, transportation, motion input, orientation sensing, and image stabilization.

One such class of electronic device is the accelerometer, which is capable of measuring acceleration by generating or altering a voltage proportional to a physical accelerative force acting thereon. Piezoelectric accelerometers are operative to convert mechanical force, such as a force applied to a piezoelectric crystal by a seismic mass, to an electrical signal. Piezo-resistive accelerometers use a piezo-resistive sensor element in place of the piezoelectric crystal. When a force acts upon a seismic mass, the stress induced on the piezo-resistive gages causes a change in resistance, thereby altering a voltage provided across the gages of the sensor element. Unlike piezoelectric accelerometers, piezo-resistive accelerometers measure acceleration levels down to zero Hertz (i.e. static conditions).

While these devices are capable of producing accurate measurements when properly calibrated, their baseline voltage outputs (at zero acceleration for example) are subject to drift. Drift may be the result of temperature and/or environmental changes, component break-in, as well as packaging stresses that tend to relax over time. The output bias of a typical accelerometer output may shift, for example, a couple percent of full range as a result of its drift, thereby reducing the measurement accuracy of the device over its lifecycle.

In order to compensate for these errors, manufacturers often employ thermal conditioning techniques in an attempt to work out these anomalies prior to final device calibration. Such techniques include extended burn-in periods and thermal cycling of the devices. However, these techniques do not fully cure the problem. Accordingly, end users either have to allot for these measurement uncertainties or employ separate instrumentation, such as auto-zero signal conditioners, to periodically perform zero correction.

Additional solutions include the implementation of mechanical potentiometers integrated into the circuits of the devices for manually dialing-out this drift. However, potentiometer-based solutions tend to be time consuming and are of limited accuracy. Other devices employ auto-zero algorithms based on ADC-MCU-DAC arrangements (where ADC is analog to digital converter, DAC is digital to analog converter, and MCU is microcontroller unit) which induce digital noise and increase cost.

Accordingly, improved systems and methods of offset voltage correction are desired.

SUMMARY

In one embodiment of the present invention a transducer-based device, such as a piezo-resistive accelerometer, is provided. The accelerometer comprises a power circuit for providing a reference voltage, and a detection circuit for generating an output voltage proportional to an accelerative force applied to the device. A compensation circuit is operatively connected to both the detection circuit and the power circuit for adjusting the zero-acceleration output voltage to match to the reference voltage.

In another embodiment of the present invention, a method of correcting an offset voltage of a transducer-based device is provided. The method comprises the steps of generating a fixed reference voltage, generating an output voltage proportional to an accelerative force applied to the device, measuring the offset voltage between the reference voltage and the output voltage in a zero-acceleration state, storing this offset voltage, and trimming the output voltage with the stored offset voltage in order to achieve a zero-offset voltage between the reference voltage and the output voltage.

DETAILED DESCRIPTION OF PREFERRED EMBODIMENTS

Figure 1:
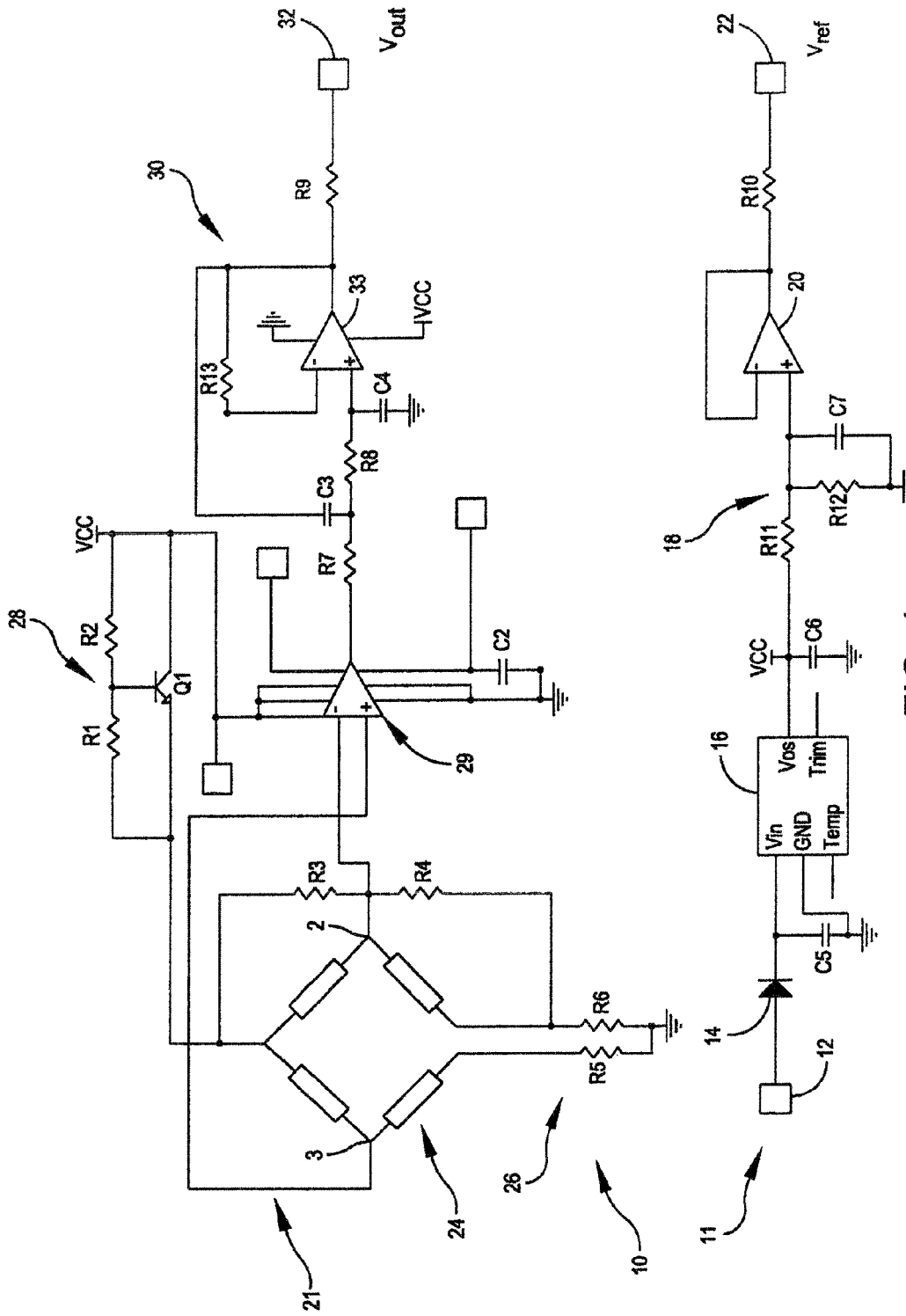
FIG. 1 is a circuit diagram of a uncorrected piezo-resistive accelerometer.

It is to be understood that the figures and descriptions of the present invention have been simplified to illustrate elements that are relevant for a clear understanding of the present invention, while eliminating, for purposes of clarity, many other elements found in typical transducer-based sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, the operation of an exemplary accelerometer 10 which may be used with embodiments of the present invention is described herein. The accelerometer 10 comprises a power circuit 11 configured to provide a constant reference voltage $V_{ref}$ at a first output terminal 22 of the accelerometer. A detection circuit 21 is operative to output a voltage corresponding to an applied accelerative force at a second output terminal 32 of the accelerometer. The exemplary accelerometer 10 is a differential measurement device, meaning the difference between these voltages is indicative of (e.g. proportional to) the measured acceleration. At zero acceleration, the output voltage from the power circuit 11 and the detecting circuit 21 should be equal, and voltage difference between the first and second terminals 22 and 32 zero volts (0V).

Still referring to FIG. 1, the exemplary power circuit 11 comprises an input terminal 12 wherein an unregulated DC input voltage is supplied to the circuit 11. A diode 14 may be arranged between the input terminal 12 and the voltage regulator 16 and configured to provide reverse polarity protection. The input voltage is provided to a voltage regulator 16 operative to output a constant voltage supply (for example 5V) to the downstream components of the power circuit 11 as well as to the detection circuit 21. A voltage divider 18 comprised of resistors R11 and R12 is coupled to the output of the voltage regulator 16 to bring the output voltage at node A down to a pre-determined reference level $V_{ref}$ (e.g. 2.5V). This reference voltage $V_{ref}$ at node A is applied to the non-inverting terminal of buffering amplifier 20. This ensures a constant reference voltage (e.g. 2.5V) is supplied to the first output terminal 22.

The detection circuit 21 is operative to generate an output voltage $V_{out}$ indicative of an accelerative force acting on the accelerometer 10. The detection circuit 21 generally comprises a supply voltage $V_{cc}$ provided by, in the exemplary embodiment, the 5V output of the voltage regulator 16 of the power circuit 11. This supply voltage may be fed through a thermal correction circuit 28 including transistor Q1 and resistors R1 and R2. The thermal correction circuit is configured to adjust the voltage supplied therethrough to compensate for any device sensitivity to temperature change.

The temperature-corrected supply voltage powers a piezo-resistive transducer arrangement. As described above, piezo-resistive accelerometers utilize a piezo-resistive sensor element in place of a traditional piezoelectric crystal. Changes in the resistance of the gages due to forces exerted thereon are reflected in a voltage provided through the sensor element. In the exemplary embodiment, the piezo-resistive arrangement comprises a Wheatstone bridge 24 having four piezo-resistive elements, two increasing in resistance as accelerative force is applied to the accelerometer 10, and two decreasing in resistance. Thus, the voltage outputs on either side of the bridge 24 move in opposite directions in response to a given acceleration. Gross correction for zero error may be provided by a resistor arrangement 26 comprising resistors R5 and R6.

Each side labeled as nodes 2,3 of the bridge 24 is connected to the one of the inverting and non-inverting terminals of an instrumentation amplifier 29. The amplifier 29 is operative to increase the gain of the output of the bridge 24. In the exemplary embodiment, the amplifier 29 may feature a programmable gain for improved accuracy, control and calibration ability. The output of the amplifier 29 is supplied to, for example, a filtering arrangement, such a two pole Butterworth filter 30 comprising capacitors C3 and C4, resistors R7, R8 and R13, and amplifier 33, for conditioning the output voltage supplied to the second output terminal 32.

As described above, under zero acceleration conditions, the ideal voltage provided to the second output terminal 32 by the detection circuit 21 should be $V_{out}$=2.5V. Likewise, the reference voltage $V_{ref}$ provided at the first output terminal 22 should be $V_{ref}$=2.5V. Thus, the difference between the voltage at second output terminal 32 and the first output terminal 22 is zero, indicating zero acceleration. As an accelerative force acts on the accelerometer 10, and the resistance of the piezo-resistive bridge arms is altered, the voltage output of respective nodes 2,3 of the bridge 24 are raised or lowered according to the direction of the acceleration. In turn, the output voltage provided to the second output terminal 32 is altered, creating a measurable difference with respect to that of the reference voltage $V_{ref}$ provided to the first output terminal 22. This difference is proportional to the accelerative force on the accelerometer 10.

As described above, voltage drift often occurs in the detection circuit 21 as the result of, for example, long-term thermal effects on the internal resistance of the circuit. Due to these variations, the output voltage provided to the second output terminal 32, at zero acceleration for example, may be above or below the 2.5V target reference level. This offset voltage also affects the voltage difference between the output terminals 22,32 during acceleration events, thereby reducing the accuracy of the device.

In one embodiment of the present invention, drift correction is achieved by embedding a correction or compensation circuit between the power circuit 11 and the detecting circuit 21 of FIG. 1. This arrangement is shown generally in FIG. 2. An accelerometer 100 comprises a similar layout and function to that described above with respect to FIG. 1. Specifically, the power circuit 111 comprises an input terminal 112 for supplying power through a diode 114 to a voltage regulator 116. The output of the voltage regulator 116 may be provided to a voltage divider 118, operative to supply a buffering amplifier 120 and, in turn, a first output terminal 122 with a constant reference voltage $V_{ref}$, of, for example, 2.5V. The output of the voltage regulator 116 is also supplied to components of the compensation circuit 131, as well as the detection circuit 121.

Similarly, the detection circuit 121 of the accelerometer 100 operates largely the same as described above with respect to FIG. 1. The detection circuit 121 comprises a piezo-resistive arrangement in the form of a Wheatstone bridge 124 for providing a variable output voltage proportional to an accelerative force acting on the accelerometer 100. An amplifier 129 increases the gain of the output of the bridge 124, which is subsequently filtered through a Butterworth filter 130, including an amplifier 133, and provided to a second output terminal 132. As described in detail above, the voltage difference between the first output terminal 122 and the second output terminal 132 is proportional to the measured acceleration of the accelerometer 100.

Drift correction is provided by compensation circuit 131. The compensation circuit 131 is operative to alter the voltage supplied to the inverting terminal of amplifier 133 in order to compensate for voltage drift within the detection circuit 121. This compensation circuit 131 operates as follows.

The reference voltage $V_{ref}$ produced by the power circuit 111 is supplied to the non-inverting terminal of an operational amplifier 136 of compensation circuit 131. Likewise, the inverting terminal of amplifier 136 is connected to the output of amplifier 133 of the detection circuit 121. Accordingly, the output of amplifier 136 is equal to the difference between the reference voltage (2.5V) and the output of the detection circuit 121. Thus, amplifier 136 provides analog bias calculation function. For example, under ideal conditions at zero-acceleration, the reference voltage and the voltage output from amplifier 133 will be equal (2.5V), and amplifier 136 will output no bias voltage. However, any voltage offset (drift) within the detection circuit 121 will be reflected by a higher or lower voltage output provided from amplifier 133 to the inverting terminal of amplifier 136.

Figure 2:
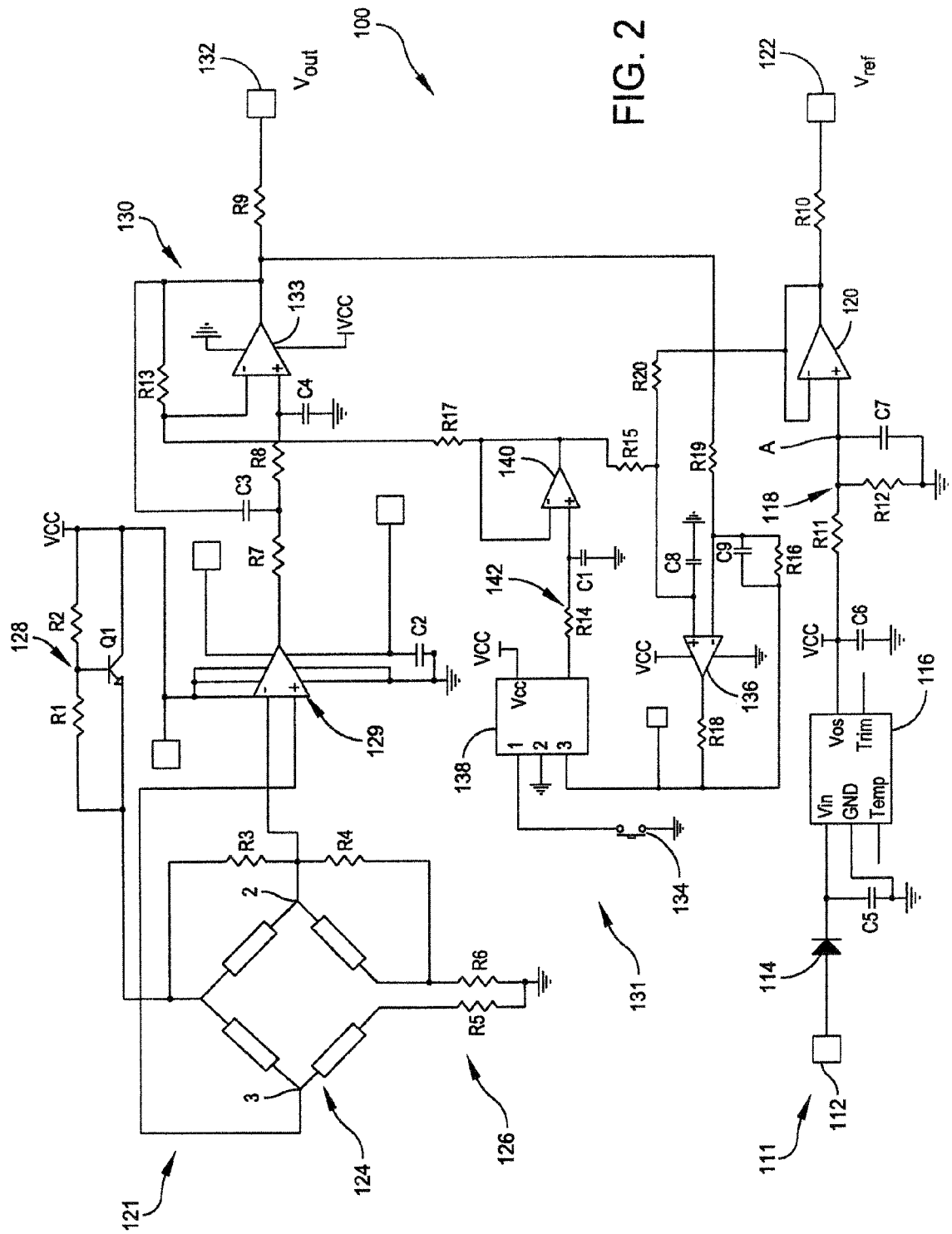
FIG. 2 is a circuit diagram of a piezo-resistive accelerometer having an auto-compensation circuit according to an embodiment of the present invention.
Figure 3:
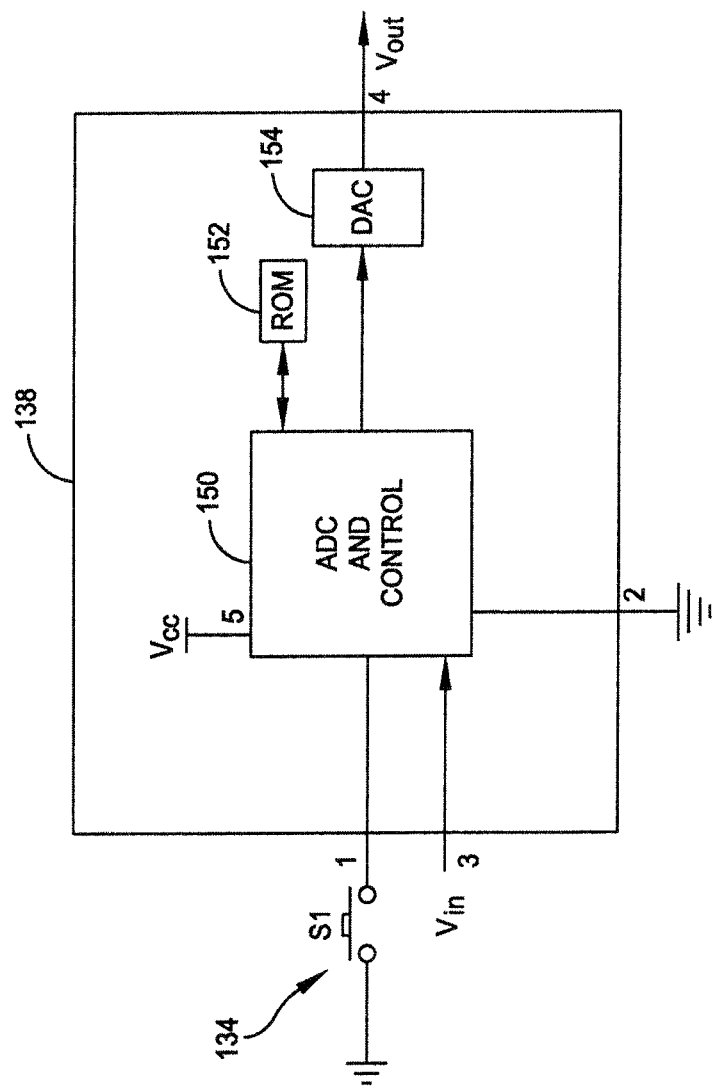
FIG. 3 is a block diagram of an exemplary voltage reference module used in embodiments of the auto-compensation circuit of the present invention.

The output of amplifier 136 is equal to the offset voltage of the detection circuit 121. Referring to FIGS. 2 and 3, this offset voltage is fed as an input voltage $V_{in}$ is fed to input pin 3 of a voltage reference module 138. The reference module 138 is operative to retain this offset voltage value. Specifically, an ADC/control model 150 is configured to store the offset voltage in memory 152, for example, ROM or EEPROM, when pin 1 of the module 138 is brought low (e.g. to ground) via a switch 134. In this way, when a user depresses the switch 134, the offset voltage supplied to pin 3 is stored and retained in memory 152. Once set, this offset voltage value is continually output through a DAC 154, and output to pin 4 of the module 138 until the switch 134 is depressed again, and a new value is stored.

The offset voltage continually supplied from pin 4 may be connected to a voltage delayer 142 comprising resistor R14 and capacitor C1 for delaying the offset voltage in order to avoid errors produced during the analog bias calculation. The delayed offset voltage is then supplied to the non-inverting terminal of amplifier 140. Amplifier 140 outputs a correction signal equal to the offset voltage to the inverting terminal of amplifier 133. The correction signal trims the output voltage supplied to the second output terminal 132 to correct for the drift.

As indicated above, the voltage reference module 138 holds the offset voltage value upon depression of the switch 134 by a user. In this way, output voltage trimming according to the stored offset value will continue indefinitely, regardless of the measured acceleration of the accelerometer 100. The offset voltage will be trimmed off or, or added to, the output voltage of the detection circuit 121 throughout its operating range. A new offset voltage is only set by a means of a subsequent control signal applied to the compensation circuit, such as through the activation of the switch 134.

The embedded arrangement depicted herein provides for quick and easy transducer offset voltage correction, without the need for additional equipment, inaccurate and time-consuming manual calibration, or the high costs associated with additional equipment and operations.

While the foregoing describes embodiments of the present invention which utilize a control signal supplied to the compensation circuit by, for example, the activation of a switch, it is further envisioned other embodiments may implement alternative arrangements to set and store the offset voltage. For example, an automatic controller may be configured in place of, or in parallel with the switch arrangement described above. This controller is adapted to provide a control signal for setting and storing the offset voltage by the compensation circuit. The control signal may be output from an evaluation circuit that compares the output of the first and second output terminals over time in order to make a determination that the device is at rest (i.e. zero acceleration). For example, the evaluation circuit may compare the voltage output at the first and second output terminals for an application-specific, predetermined time period. If the voltage difference remains constant between the first and second output terminals over the predetermined time period (indicative of the device under zero acceleration), the controller may output the control signal to the compensation circuit for setting and storing the offset voltage.

While the foregoing describes embodiments of the present invention used with an exemplary piezo-resistive accelerometer, it is envisioned that additional embodiments of the present invention may be implemented into numerous other types of transducer-based devices, including piezoelectric or strain-gauge based accelerometers without departing from the scope of the present invention.

While the foregoing describes exemplary embodiments and implementations, it will be apparent to those skilled in the art that various modifications and variations can be made to the present invention without departing from the spirit and scope of the invention.

What is claimed is:

1. A transducer-based measuring device comprising:
a power circuit for providing a reference voltage to a first output terminal of the measuring device;
a detection circuit for providing an output voltage to a second output terminal of the measuring device, the output voltage indicative of an accelerative force acting on the measuring device; and
a compensation circuit embedded between the power circuit and the detection circuit of the measuring device and operatively connected to both the power circuit and the detection circuit, the compensation circuit configured to measure and store an offset voltage between the reference voltage and the output voltage, and continuously output the stored offset voltage to the detection circuit to provide an adjusted output voltage representative of a zero-offset condition.

2. The device of claim 1, wherein the compensation circuit further comprises a voltage reference module operative to store and continuously output the offset voltage.

3. The device of claim 2, wherein the voltage reference module stores the offset voltage upon receipt of a control signal, and wherein the offset voltage output by the voltage reference module remains constant after receipt of the control signal and until receipt of a subsequent control signal.

4. The device of claim 3, wherein the control signal is generated by a user-activated switch arranged on the device.

5. The device of claim 3, further comprising a processor operative to generate the control signal upon a determination that the device is in a zero acceleration state.

6. The device of claim 1, wherein the compensation circuit further comprises an operational amplifier coupled to the output voltage and the reference voltage, the amplifier configured to output the offset voltage measured between the reference voltage and the output voltage.

7. The device of claim 6, wherein the detection circuit comprises a second operational amplifier responsive to the output voltage of the detection circuit and the offset voltage and configured to alter the output voltage supplied to the second output terminal.

8. The device of claim 1, wherein the detection circuit comprises at least one of a piezo-resistive, piezoelectric, or strain gauge element configured to alter the output voltage of the detection circuit indicative of an accelerative force acting on the measuring device.

9. The device of claim 8, wherein the detection circuit comprises a plurality of piezo-resistive elements arranged in a Wheatstone bridge.

10. A method of correcting an offset voltage of a transducer-based measuring device, the method comprising:
generating a reference voltage;
generating an output voltage indicative of an accelerative force applied to the measuring device;
measuring an offset voltage between the reference voltage and the output voltage with a compensation circuit embedded within the measuring device, and
adjusting the output voltage with the measured offset voltage in order to achieve a zero-offset voltage between the reference voltage and the output voltage in a zero acceleration state.

11. The method of claim 10, further comprising the step of storing the measured offset voltage in response to a control signal.

12. The method of claim 11, wherein the control signal is generated while the device is in a zero acceleration state.

13. The method of claim 11, further comprising the step of continuously outputting the stored offset voltage to adjust the output voltage.

14. The method of claim 11, wherein the control signal is generated in response to the user-activation of a switch arranged on the measuring device.

15. The method of claim 11, wherein the control signal is automatically generated by a processor.

16. A transducer-based measuring device comprising:
- a power circuit configured to generate a reference voltage;
- a detection circuit configured to generate an output voltage indicative of an accelerative force applied to the measuring device; and
- a compensation circuit embedded within the measuring device and configured to:
  - measure an offset voltage between the reference voltage and the output voltage; and
  - adjust the output voltage with the measured offset voltage in order to achieve a zero-offset voltage between the reference voltage and the output voltage in a zero acceleration state.

* * * * *